March 7, 1967   E. J. KRAFT   3,307,751
ANTI-FOAMING FLOW RESTRICTOR
Filed Jan. 19, 1966
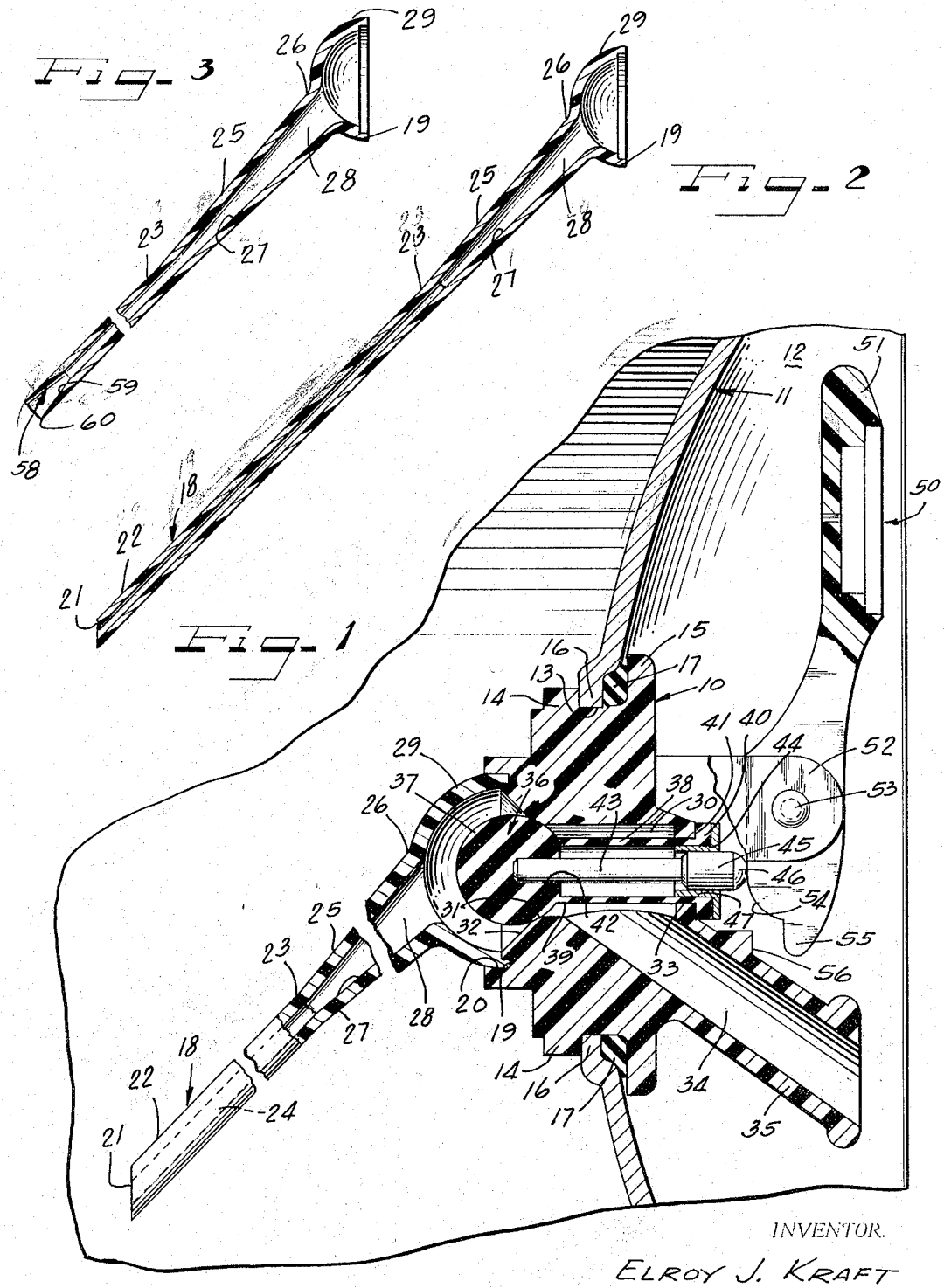
INVENTOR.
ELROY J. KRAFT
BY *Hill, Sherman, Meroni, Gross & Simpson*   ATTORNEYS

United States Patent Office 3,307,751
Patented Mar. 7, 1967

3,307,751
ANTI-FOAMING FLOW RESTRICTOR
Elroy J. Kraft, Des Plaines, Ill., assignor to The Dole Valve Company, Morton Grove, Ill., a corporation of Illinois
Filed Jan. 19, 1966, Ser. No. 521,617
1 Claim. (Cl. 222—464)

This invention relates to a liquid dispenser valve and more particularly relates to a valve having a flow restrictor for minimizing foaming of a gaseous liquid and for providing maximum sanitary protection to a beverage dispenser system.

It has been found that foaming of gaseous liquids such as carbonated drinks can be minimized by providing a smooth contoured flow path to a valve system and by gradually, rather than abruptly, changing the flow pressure as the fluid moves through the valve.

Smooth fluid flow can be ideally achieved by eliminating O-rings, joints and all abrupt surfaces in the flow path. Pressure differentials across the fluid flow can be minimized ideally by reducing the flow rate through the system. The flow rate can, in turn, be reduced by minimizing the transverse area of the flow path conducting from the fluid supply to the valve inlet.

However, a principal obstacle in assuring a smooth beverage flow in a dispenser valve has been developing the proper structure for conducting the flow smoothly about the valve head. Also, while pressure differentials can be reduced by minimizing the transverse area of the flow path, sanitary considerations inhibit the use of undersized flow paths. Principally, dispenser valves permanently mounted in dispenser drums or kegs are backwashed and sterilized through the spigot. This means that foreign matter collected on the spigot during disuse will be forced into the restricted flow path with the result that foreign matter may be clogged in lines which do not have an adequate flow diameter.

Accordingly it is a principal object of this invention to provide a liquid dispenser valve for dispensing gaseous liquids with minimum foaming and with maximum sanitary protection.

It is also an object of this invention to provide a liquid dispensing valve having a flow restrictor which reduces the flow rate from a fluid supply to the valve inlet and which has a suitable flow diameter to allow back flushing of the valve system.

It is another object of this invention to provide a flow restrictor for a dispenser valve having an expansion section for gradually decreasing the pressure on the fluid flow and a constriction section for reducing the flow rate by exhibiting a substantially elongate flow path.

It is another object of this invention to provide a liquid dispenser valve having a substantially continuous uninterrupted flow path from the inlet of the flow restrictor to the outlet spigot of the valve assembly.

It is a further object of this invention to provide a liquid dispenser valve having a bulbous type valve head and a complementarily formed inlet housing which is contoured to join with an expansion section of a flow restrictor for directing fluid smoothly about the bulbous valve head to an outlet spigot.

It is an additional object of this invention to provide an anti-foaming flow restrictor for a liquid dispensing valve having a bulbous type inlet housing portion contoured to an elongate inlet tubing for gradually reducing the pressure differential across the flow surface and having an inlet end diverging outwardly at the interior wall thereof for providing a smooth and continuous fluid flow from the fluid source into the flow restrictor.

It is also an object of this invention to provide a flow restrictor having an elongate inlet tubing for reducing the pressure differential across the fluid flow wherein the end of the tubing is terminated at a substantial angle with the axis of the restrictor tubing for increasing the area of the restrictor inlet and for maintaining a substantially uninterrupted flow from the fluid source into the valve system.

These and other objects, features and advantages of the present invention will be understood in greater detail from the following description and the associated drawings wherein reference numerals are utilized in designating a preferred embodiment and wherein:

FIGURE 1 is a sectional view of a liquid dispensing valve according to this invention wherein the valve is deployed within its working environment and wherein a flow restrictor is operably disposed for achieving the objects and advantages of this invention;

FIGURE 2 is a sectional view of a flow restrictor as utilized in the dispensing valve of FIGURE 1; and FIGURE 3 is an alternate form of the flow restrictor for accomplishing the anti-foam and sanitary objectives of this invention.

This invention concerns generally a liquid dispensing valve 10 which is securely mounted within a drum or keg 11 containing pressurized gaseous liquid such as carbonated drinks or the like. The drum 11 has a concave end wall 12 which provides a recessed region for the valve assembly, allowing tier stacking of the kegs.

The valve 10 has a groove 13 formed between a ridge 14 and a flange or collar 15. The groove 13 is fitted within the cooperable rim 16 of the end wall 12, and a seal ring 17 is disposed between the rim 16 and the flange 15 to form a pressure seal with the interior of the keg 11. The seal is accomplished by heat forming the flange 15 after the valve and seal ring have been properly positioned.

A flow restrictor 18 is rigidly mounted to the valve 10 at an annular seat 19 and an annular wall 20. The flow restrictor, as shown in FIGURE 2, is elongate in form and extends from the valve at the annular seat and rim 19 and 20 to the base of the keg 11 for conducting fluid therethrough to the valve assembly.

The flow restrictor 18 has an open end 21 for receiving fluid into the valve and for minimizing foaming at the valve outlet. The open end 21 is formed at approximately 45° to the axis of the flow restrictor, and consequently fluid within the keg 11 flows freely into the open end 21 without encountering interference between the restrictor and the base of the keg. In addition by forming the end 21 of the restrictor 18 at a substantial angle as shown in FIGURE 1, the effective inlet area of the restrictor is increased. The result is to minimize violent movement of the fluid in the region of the restrictor inlet thereby reducing the possibilities of liberating the carbon dioxide from the beverage.

The flow restrictor 18 consists of three portions. First, a constriction portion 22 extends from the open end 21 to a point 23 and is substantially cylindrical in shape. The constriction portion is elongate in nature and has a flow path 24 having a minimum diameter to provide for sanitary back flushing through the valve. The flow path 24 may have a diameter in the order of .086 inch while the path 24 may be several inches in length. The resulting elongate nature of the flow path 24 reduces the flow rate of the beverage as it moves from the open end 21 to the point 23. It has been found that the reduction in flow rate through the valve is a function of both the diameter of the path 24 and the length of that path. Therefore, while reductions in diameter may not be advisable from backflushing reasons, increasing the path length may accomplish the desired result of slowing the flow rate.

The second section of the flow restriction 18 is an expansion section 25 which extends from the point 23 at the constriction section 22 to a point 26. The expansion section 25 is similarly elongate in nature and has a tapered inner wall 27 which extends from the diameter of the constriction path 24 at the point 23 to a maximum diameter at the point 26. The flow path 28, formed by the tapered wall 27, is conical in configuration and due to its elongate nature permits the gradual decreasing of fluid pressure from the constriction section 24 to the interior of the valve itself.

The third section of the flow restrictor 18 is a bulbous inlet housing portion 29 which is secured integrally at the point 26 to the expansion section 25. The bulbous inlet housing 29 is seated and secured at the facings 19 and 20 of the valve 10. The expansion section 25 is connected to the bulbous inlet housing 29 at a substantially tangential angle to allow the fluid flow to follow the inside surface of the housing 29 and to avoid abruptly contacting interior valve structures.

The interior of the valve consists of a cylindrical actuation chamber 30 which has a valve seat 31 formed at the inlet end thereof and which connects directly through a tapered wall 32 to the interior of the bulbous inlet housing 29.

The cylindrical actuation chamber 30 extends through the valve to an actuation opening 33. Also, an outlet passage 34 extends angularly from the actuation chamber 30 through an outlet spigot 35.

A valve element 36 is used to control the flow of beverage from the flow restrictor to the spigot 35 and comprises essentially a bulbous type valve head 37 which is complementary to and formed with the interior of the inlet housing 29. The valve head 37 has a cylindrical resilient sleeve member 38 secured thereto at a point 39; the sleeve terminates in a collar or bead 40.

The bead 40 is seated at a face 41 formed about the actuation opening 33, and the valve head 37 is seated at the valve seat 31. The seating of the bead 40 and the head 37 at the indicated surfaces of the valve 10 is accomplished by stretching the cylindrical portion 38 of the valve element 36 within the actuation chamber 30. Therefore, the cylindrical portion 38 biases the valve head 36 against the seat 31 and also holds the bead 40 against the face 41.

The valve head 37 has a well 42 formed therein for receiving an actuation pin 43. The pin 43 is received interiorly of the cylindrical sleeve portion 38 of the valve element 36 through an opening 44 formed centrally thereof. The actuation pin 43 has an enlarged pressure head 45 which, in turn, has a contoured surface 46 at the outermost extremity. The head 45 is received within the opening 44 of the sleeve 38 and is guided by a bearing sleeve 47. The sleeve 47 reduces the wear which would otherwise be experienced directly on the interior of the cylindrical sleeve 38 due to the actuation of the pin 43.

By depressing the pin 43 inwardly toward the valve head 37, the head 37 may be lifted off the valve seat 31 and moved toward the bulbous inlet housing 29. Fluid from the interior of the keg 11 will then flow through the flow restrictor around the bulbous valve head and into the outlet passage 34 of the spigot 35. As indicated, the flow rate will be considerably reduced due to the minimized diameter of the flow path 24 of the restrictor 18 and due to the elongate nature of the constrictor portion 22. Also, foaming will be substantially eliminated due to the reduced flow rate and due to the elimination of abrupt interfering surfaces in the system. Principally, foam is minimized by the angled relationship of the open end 21 of the flow restrictor as well as by the gradual expansion of the fluid within the expansion section 25. In addition, fluid entering the interior of the bulbous inlet housing is caused to move smoothly about the bulbous valve head 37 due to the substantially tangential orientation of the flow restrictor tubing relative to the inlet housing 29. Also, the configuration of the valve head allows a substantially uninterrupted flow into the outlet passage 34 of the spigot 35.

The actuation pin 43 may be depressed by a handle means 50 which consists of a lever 51 pivotally mounted to a handle support 52 at a point 53. The handle means has a contoured action face 54 for contacting the spherical extremity 46 of the actuation pin 43. Also, the handle 50 has a finger section 55 for contacting a handle stop 56 which is formed integrally with the spigot 35. When the handle 50 is rotated clockwise in FIGURE 1, the contoured surface 54 acts at the spherical extremity 46 of the actuation pin 43 and depresses the pin for lifting the valve head 37 off the valve seat 31. Rotation of the handle 50 eventually causes the finger portion 55 to contact the handle stop 56 at the spigot 35, thereby preventing overactuation of the valve.

An alternate embodiment of the flow restrictor of this invention is shown in FIGURE 3 and consists essentially of an alternate means of forming the open end 21 of the flow restrictor as shown in FIGURE 1. In FIGURE 3, the open end 58 of the flow restrictor is formed by tapering the interior of the constriction section walls to form a diverging inlet characterized by the conical shape wall 59. Through the use of the diverging open end as shown in FIGURE 3, the abrupt regions exposed to the onrushing fluid are additionally minimized. Particularly, the end 60 of the flow restrictor shown in FIGURE 3 may be tapered to form a sharp edge which promotes a smooth flow from the fluid source into the flow restrictor. In this way, fluid entering the restrictor 18 is substantially undisturbed, as all means which could stimulate liberation of the gaseous component of the beverage have been eliminated.

It is apparent that various modifications and combinations of the features disclosed herein may be accomplished by those versed in the art, but I desire to claim all such modifications and combinations as properly come within the scope and spirit of my invention.

I claim as my invention:

A liquid dispensing valve comprising:
    a valve body having an inlet and outlet and a connecting flow passage therebetween,
    valve means operable for controlling the flow of fluid to the outlet,
    an anti-foaming flow restrictor secured to said inlet and conducting fluid to said inlet from fluid source,
    said flow restrictor having a smooth flow passage including a diverging opened end,
    said diverging opened end having a wall thickness substantially tapered toward the end of the restrictor and forming a substantially thin edge thereat for preventing the swirling of fluid passing into the restrictor from the fluid source.

References Cited by the Examiner

UNITED STATES PATENTS

| | | | |
|---|---|---|---|
| 3,096,000 | 7/1963 | Staley | 222—386.5 X |
| 3,195,788 | 7/1965 | Wilson | 222—464 X |
| 3,245,583 | 4/1966 | Miller et al. | 222—464 X |

ROBERT B. REEVES, *Primary Examiner.*

M. HENSON WOOD, JR., *Examiner.*

F. R. HANDREN, *Assistant Examiner.*